US011221924B2

United States Patent
Bombacino et al.

(10) Patent No.: US 11,221,924 B2
(45) Date of Patent: Jan. 11, 2022

(54) BACK-UP OF INFORMATION STORED IN MOBILE COMPUTING DEVICES

(71) Applicant: International Business Machines Corporation, Armonk, NY (US)

(72) Inventors: Vinicio Bombacino, Rome (IT); Riccardo Pizzutilo, Rome (IT); Andrea Tortosa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 16/679,715

(22) Filed: Nov. 11, 2019

(65) Prior Publication Data

US 2020/0073762 A1 Mar. 5, 2020

Related U.S. Application Data

(63) Continuation of application No. 15/163,742, filed on May 25, 2016, now Pat. No. 10,540,239.

(51) Int. Cl.
*G06F 11/14* (2006.01)
*H04W 4/02* (2018.01)
(Continued)

(52) U.S. Cl.
CPC ........ *G06F 11/1464* (2013.01); *G06F 16/178* (2019.01); *H04W 4/023* (2013.01);
(Continued)

(58) Field of Classification Search
CPC .. G06F 11/1464; G06F 16/178; G06F 16/252; G06F 16/27; H04W 4/027; H04W 8/24; H04W 64/003
See application file for complete search history.

(56) References Cited

U.S. PATENT DOCUMENTS 8,164,847 B2 * 4/2012 Shibata ................. G11B 21/12
360/75
8,260,750 B1 9/2012 Gugick et al.
(Continued)

FOREIGN PATENT DOCUMENTS

EP 2658229 10/2013

OTHER PUBLICATIONS mclamorsicata.it, Retrieved on Jan. 20, 2016, Retrieved from: http://www.melamorsicata.itlmela/2013/10/11/apple-brevetta-sistema-proteggere-1iphone-che-cade/, 8 pages.
(Continued)

*Primary Examiner* — Dangelino N Gortayo
(74) *Attorney, Agent, or Firm* — Schmeiser, Olsen & Watts, LLP; Nicholas L. Cadmus

(57) ABSTRACT

A method, and associated computer program product and mobile computing device, for backing-up information stored in the mobile computing device. The mobile computing device detects one or more support computing devices located within a corresponding communication range and being available to support the mobile computing device for backing-up the information stored in the mobile computing device. The mobile computing device detects a dangerous condition indicative of a risk of inoperability of the mobile computing device. The mobile computing device sends back-up information corresponding to selected information stored in the mobile computing device to at least one of the support computing devices in response to the detection of the dangerous condition to cause the at least one support computing device to upload the back-up information to a back-up computing system.

20 Claims, 6 Drawing Sheets

(51) Int. Cl.
*H04W 8/24* (2009.01)
*H04W 64/00* (2009.01)
*G06F 16/178* (2019.01)
*G06F 16/25* (2019.01)
*G06F 16/27* (2019.01)

(52) U.S. Cl.
CPC ............. *H04W 4/027* (2013.01); *H04W 8/24* (2013.01); *H04W 64/003* (2013.01); *G06F 11/1461* (2013.01); *G06F 16/252* (2019.01); *G06F 16/27* (2019.01)

(56) References Cited

U.S. PATENT DOCUMENTS

| | | | | |
|---|---|---|---|---|
| 8,341,121 | B1* | 12/2012 | Claudatos | G06F 11/1461 |
| | | | | 707/640 |
| 8,804,271 | B2* | 8/2014 | Hirata | G11B 19/042 |
| | | | | 360/75 |
| 8,904,206 | B2 | 12/2014 | Black et al. | |
| 8,949,556 | B2 | 2/2015 | Chakra et al. | |
| 10,133,508 | B1 | 11/2018 | Smaldone et al. | |
| 10,810,088 | B1* | 10/2020 | Gu | G06F 11/1464 |
| 2003/0125057 | A1 | 7/2003 | Pesola | |
| 2007/0207729 | A1 | 9/2007 | Chen et al. | |
| 2008/0200207 | A1 | 8/2008 | Donahue et al. | |
| 2012/0084259 | A1* | 4/2012 | Welingkar | G06F 21/88 |
| | | | | 707/647 |
| 2013/0282660 | A1* | 10/2013 | Xu | G06F 11/1458 |
| | | | | 707/640 |
| 2014/0147092 | A1 | 5/2014 | Liu et al. | |
| 2014/0164322 | A1 | 6/2014 | Beaurepaire et al. | |
| 2017/0177449 | A1* | 6/2017 | Bronk | G06F 11/1464 |
| 2017/0344436 | A1 | 11/2017 | Bombacino et al. | |

OTHER PUBLICATIONS

Office action (dated Mar. 6, 2019) for U.S. Appl. No. 15/163,742, filed May 25, 2016.
Amendment (dated Jun. 4, 2019) for U.S. Appl. No. 15/163,742, filed May 25, 2016.
Notice of Allowance (Sep. 11, 2019) for U.S. Appl. No. 15/163,742, filed May 25, 2016.

* cited by examiner

BACK-UP OF INFORMATION STORED IN MOBILE COMPUTING DEVICES

This application is a continuation application claiming priority to Ser. No. 15/163,742, filed May 25, 2016, now U.S. Pat. No. 10,540,239, issued Jan. 21, 2020.

TECHNICAL FIELD

The present disclosure relates generally to data processing and more specifically, to the back-up of information stored in mobile computing devices.

BACKGROUND

Mobile computing devices, or mobile devices (for example, smart-phones), have become more and more popular in recent years. Modern mobile devices have a processing power comparable to conventional computers. Therefore, these mobile devices make most processing activities (which had to be performed on computers in the past) substantially ubiquitous, since the mobile devices may be used almost everywhere. For example, the mobile devices allow exchanging e-mails, accessing bank accounts, sending payments.

As a consequence, the mobile devices generally store information that may be quite critical (for example, passwords). However, since the mobile devices are held and carried daily, the mobile devices are increasingly subject to accidental damages (for example, by falling down), subjecting the mobile devices to possible breakage, with a risk of losing the information stored therein.

Therefore, selected information stored in the mobile devices is often backed-up periodically (for example, by synchronizing the backed-up information with cloud services). However, any update to the information after the last synchronization of the information is lost when the mobile device breaks. Moreover, the stored information may involve some security concerns. Indeed, although access to the information stored in the cloud services requires authentication, the stored information remains available in unencrypted form to third parties.

Most mobile devices are also provided with sensors (for example, accelerometers) used to monitor accelerations of the mobile devices, so that it is possible to detect when the mobile devices are falling down. This detection of the mobile devices falling down may trigger the back-up of selected information stored in the mobile devices automatically. Thus, it is possible to back-up the latest version of the information. Moreover, the information is backed-up only when necessary and may be deleted after being restored, so that the information remains available to third parties for a short time only For example, an agent monitors an acting force exerted on a mobile device in a vertical direction to detect when the mobile device is falling down. In response thereto, the agent sends a secure connection request to a backup server instructing the backup server to establish a communication channel for the mobile device (after authenticating the mobile device). The mobile device then uploads selected information to the backup server through this communication channel. Alternatively, the agent monitors a current posture of the mobile device and then an acting force exerted on the mobile device in a horizontal direction and in a vertical direction. The agent detects that the mobile device is slipping off (for example, on a desktop) when the acting force in the horizontal direction is not zero. In response thereto, the agent establishes a communication channel with the backup server as above. If the agent then detects that the mobile device is falling down, then the agent uploads the information to the backup server through this communication channel already established in advance.

However, the time required to establish the communication channel with the back-up server (especially to authenticate the mobile device) may be relatively long. Therefore, the time remaining before the possible breakage of the mobile device may be not be sufficient to upload the information to the back-up server (for example, when the mobile device falls down suddenly).

Moreover, the data rate of the communication channel may be sufficiently low (for example, in case of poor communication quality) to impair the uploading of the information to the back-up server.

In any case, it may not possible to establish the communication channel with the back-up server (for example, when no access to the Internet is available), and then to upload the information stored in the mobile device thereto.

Therefore, the back-up of the information stored in the mobile devices may not be guaranteed.

SUMMARY

Embodiments of the present invention provide a method, and associated computer program product and mobile computing device, for backing-up information stored in the mobile computing device. The mobile computing device detects one or more support computing devices located within a corresponding communication range and being available to support the mobile computing device for backing-up the information stored in the mobile computing device. The mobile computing device detects a dangerous condition indicative of a risk of inoperability of the mobile computing device. The mobile computing device sends back-up information corresponding to selected information stored in the mobile computing device to at least one of the support computing devices in response to the detection of the dangerous condition to cause the at least one support computing device to upload the back-up information to a back-up computing system.

DETAILED DESCRIPTION

Figure 1:
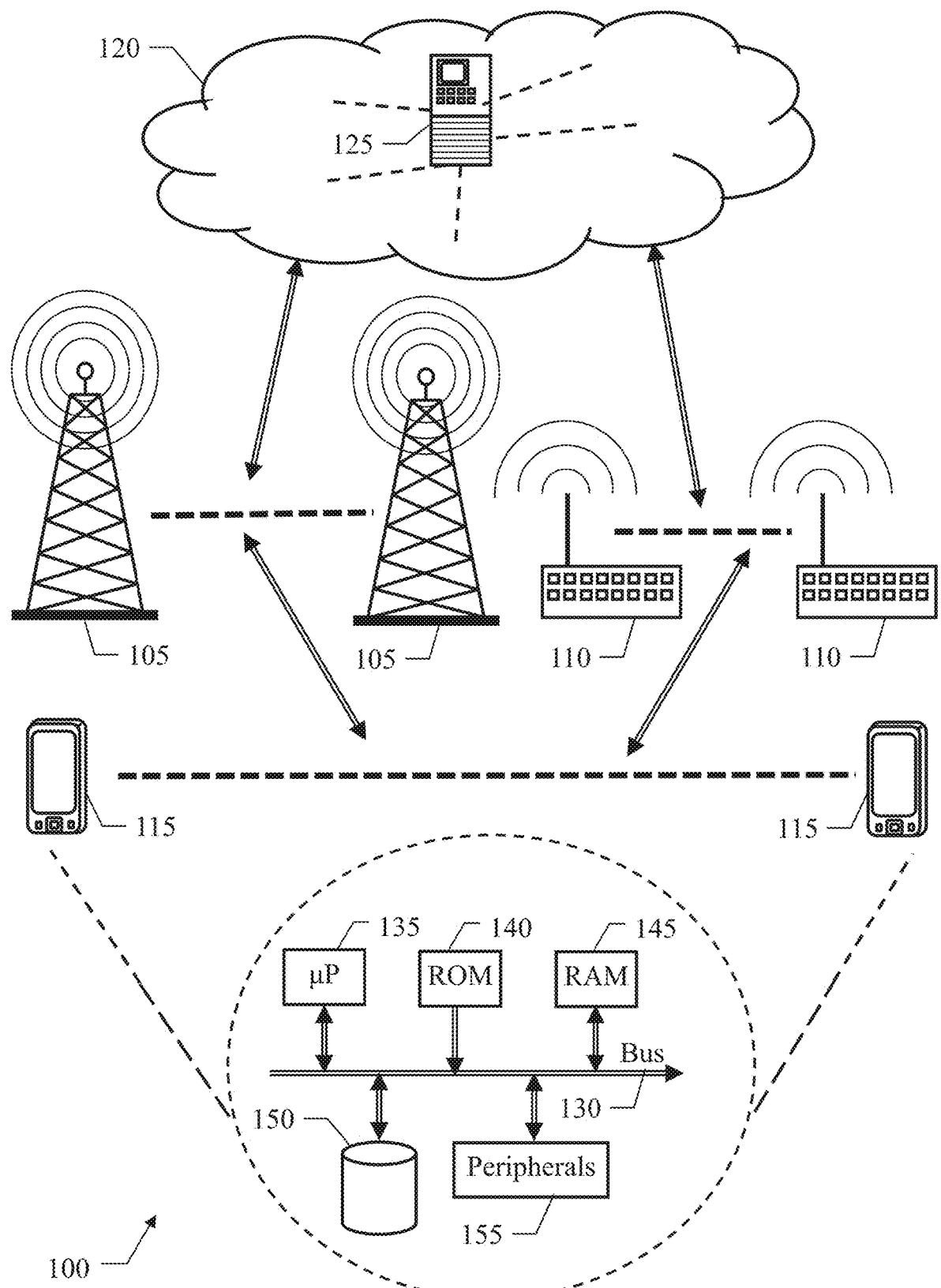
FIG. 1 shows a pictorial representation of an infrastructure, in accordance with embodiments of the present invention.

FIG. 1 shows a pictorial representation of an infrastructure 100, in accordance with embodiments of the present invention.

The infrastructure 100 comprises a mobile telephone network or mobile network 105 which provides data communication services offered by corresponding mobile telephone operators (for example, implementing different technologies from EDGE to LTE). The mobile network 105 comprises a number of base stations defining mobile telephone cells for connection thereto. The infrastructure 100 further comprises a number of wireless network access points 110, or Access Points (AP), for example, based on the Wireless Fidelity (Wi-Fi) technology. Each access point 110 provides data communication services based on the IEEE 802.11 specification within a corresponding transmission range. A number of mobile computing devices, for example, smart-phones 115 may connect to either the mobile network 105 or the access points 110.

Both the mobile network 105 and the access points 110 are connected (for example, through a fixed-line telephone network not shown in FIG. 1) to the Internet 120. At least some of the access points 110 are unprotected (also known as hotspots) so as to allow the connection to the Internet 120 unconditionally. For example, the unprotected access points 110 may be public (allowing the connection to the Internet 120 for free) or commercial (redirecting to a captive portal that conditions the access to the Internet 120 to some sort of registration/payment). The Internet 120 is formed by millions of computing systems (computers) that are interconnected through a global communication network (not shown in FIG. 1). Particularly, the Internet 120 comprises a back-up computing system, for example, implemented by a back-up server 125 (or more), which is used to back-up information stored in the smart-phones 115.

A computing device, computer or computer system of the infrastructure 100 (i.e., each access point 110, each smart-phone 115 and the back-up server 125) comprises several units that are connected in parallel to a bus structure 130 (with an architecture that is suitably scaled according to the actual function of the computing device, computer or computer system). Particularly, one or more microprocessors (μP) 135 control operation of the computing device, computer or computer system. A ROM 140 stores basic code for a bootstrap of the computing device and a RAM 145 is used as a working memory by the microprocessors 135. The computing device, computer or computer system is provided with a mass-memory 150 for storing information to be preserved even when a power supply is off. For example, the mass memory 150 of the access points 110 and of the smart-phones 115 comprises a flash memory and the mass memory 150 of the back-up server 125 comprises storage devices of a server farm implementing embodiments of the present invention. Moreover, the computing device, computer or computer system comprises a number of peripheral (or Input/Output, I/O) units 155. For example, the peripheral units 155 of the access points 110 comprise a Wireless Network Interface Card (WNIC) of the Wi-Fi type for communicating with the smart-phones 115 and a router for connecting to the Internet 120. The peripheral units 155 of the smart-phones 115 comprise a mobile telephone transceiver (TX/RX) for communicating with the mobile network 105, a WNIC of the Wi-Fi type for communicating with the access points 110, a Bluetooth transceiver for communicating with other smart-phones 115, a GPS receiver for detecting a current position, and a (multi-axis) accelerometer for measuring proper accelerations of the smart-phone 115. The peripheral units 155 of the back-up server 125 comprise a NIC for plugging in the Internet 120 and a drive for reading/writing removable storage units (e.g., DVDs) implemented by a console of the server farm.

Figure 2A:
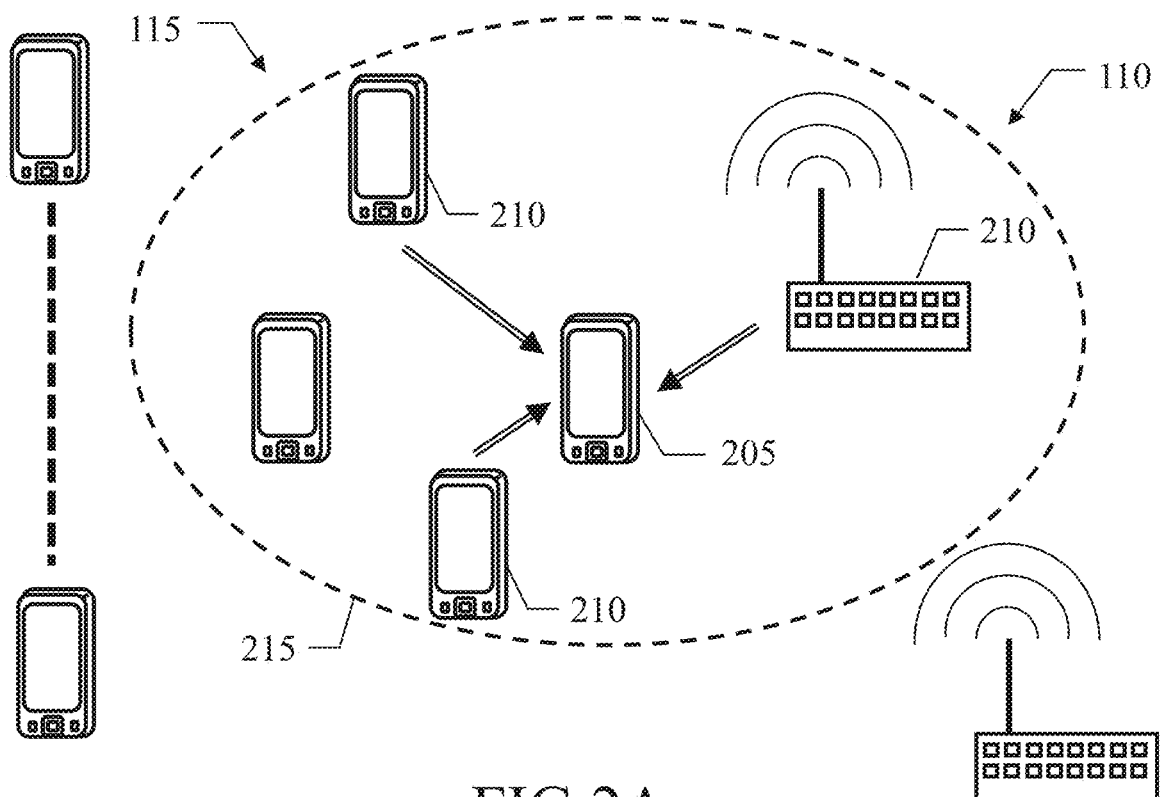
FIGS. 2A-2C show general principles, in accordance with embodiments of the present invention.
Figure 2B:
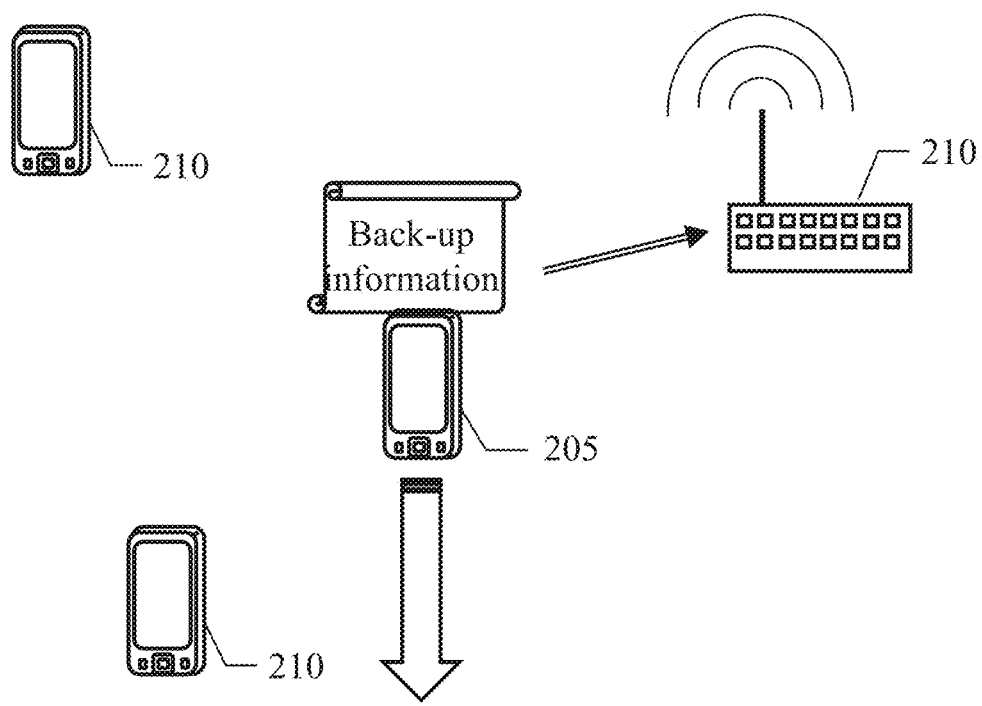
Figure 2C:
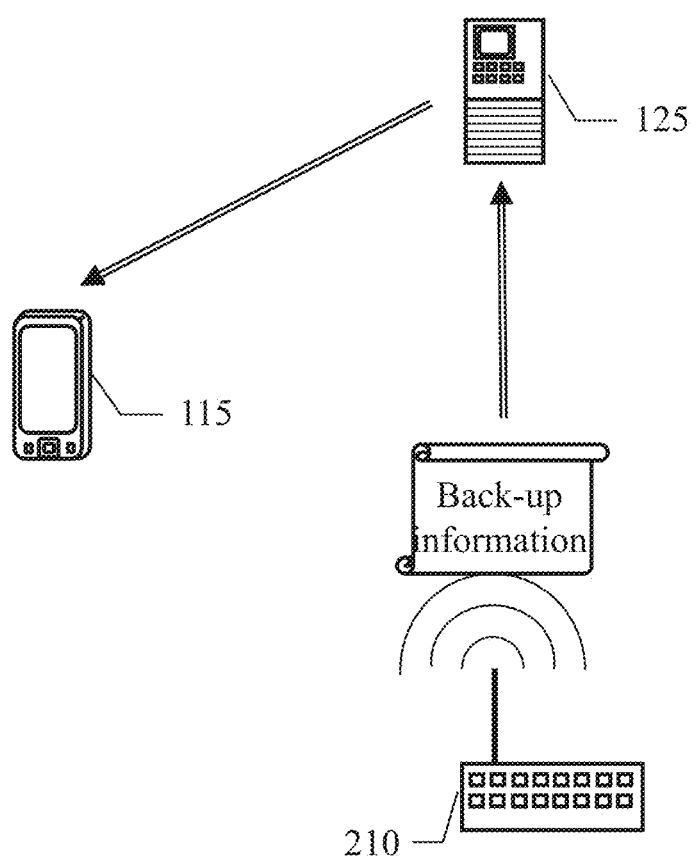

FIGS. 2A-2C show general principles, in accordance with embodiments of the present invention.

Starting from FIG. 2A, a smart-phone 115 implements the solution according to an embodiment of the present invention for backing-up information stored in the smart-phone 115 (hereinafter, the smart-phone 115 whose information is backed up is referred to as secured device 205). The secured device 205 detects one or more access points 110 and/or other smart-phones 115 that may support the secured device 205 (hereinafter, referred to as support devices 210). The support devices 210 are located within a corresponding communication range 215. Only one communication range is shown in FIG. 2A as a circular or elliptical area around the secured device 205. At the same time, the support devices 210 are available to support the secured device 205 for backing-up information stored in the secured device 205 (for example, other secured devices, private access points of their users or public/commercial access points specifically configured for this purpose). For example, this back-up result is achieved by broadcasting a corresponding request by the secured device 205 and listening for any response from the support devices 210 that have received the request.

In FIG. 2B, the secured device 205 detects a dangerous condition indicative of a risk of inoperability of the secured device 205 (for example, when the secured device 205 is falling down) in response, back-up information corresponding to selected information stored in the secured device 205 (for example, prepared in advance by encrypting the selected information) sent to one or more of the support devices 210 (the support device 210 implemented by access point), for example, by selecting the support devices 210 in decreasing order of priority.

In FIG. 2C, each support device 210 that has received the back-up information from the secured device 205 uploads the back-up information to the back-up server 125. The back-up information is then available on the back-up server 125 for its next downloading and restoring by a user of the secured device 205 (for example, to a new smart-phone 115).

In this way, the support devices create an ad-hoc network that implements a (peer-to-peer) temporary emergency infrastructure ready to support the secured device 205 for backing-up information stored in the secured device 205. Indeed, the support devices are detected by the secured device 205 but remain inoperative under normal conditions. However, as soon as the secured device 205 detects its dangerous condition, the support devices (or at least a portion of the support devices) promptly receive the back-up information and then upload the back-up information (acting as proxies) to the back-up server 125 as soon as possible. Therefore, the time between the detection of the dangerous condition and the possible breakage of the secured device 205 is generally sufficient to send the back-up information to at least one support device (which may then upload the back-up information to the back-up server 125 without any time constraints).

In this way, it is possible to back-up information stored in the secured device 205 in its last (up-to-date) version in most practical situations. Indeed, assuming that at least one support device is available around the secured device 205, back-up information of the secured device 205 may be sent to the support device 210 (and then uploaded to the back-up server 125) even when it is impossible to establish a suitable communication channel with the back-up server 125 (for example, when the data rate of the back-up server 125 is too low or no access to the Internet 120 is available) which significantly reduces the risk of losing information stored in the secured device 205.

Figure 3:
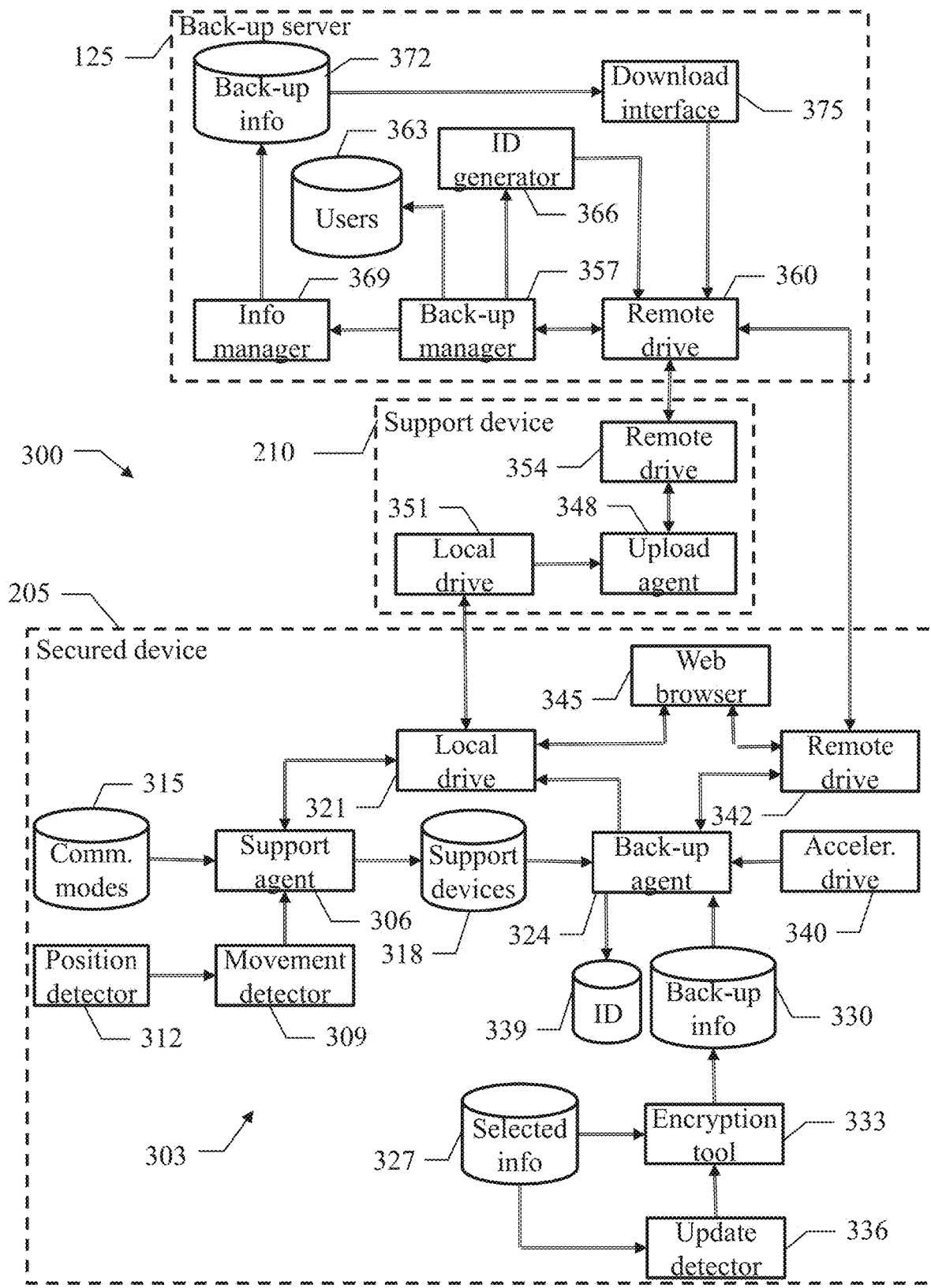
FIG. 3 shows software components that may be used to implement embodiments of the present invention.

FIG. 3 shows software components that may be used to implement embodiments of the present invention.

Particularly, all the software components (programs and data) are denoted as a whole with the reference 300. The software components are typically stored in the mass memory 150 and loaded (at least partially) into the working memory of each computing device when the programs are running, possibly together with an operating system and other application programs (not shown in FIG. 3). The programs are initially installed into the mass memory 150, for example, from removable storage units or from the Internet 120. In this respect, each program may be a module, segment or portion of code, which comprises one or more executable instructions for implementing the specified logical function.

Each secured device 205 runs a back-up application 303 (for example, implemented by an app that has been downloaded from the back-up server 125 or from an app store). The back-up application 303 comprises a support agent 306 used to detect the support devices 210. The support agent 306 exploits a movement detector 309 used to detect a movement of the secured device 205. The movement detector 309 in turn exploits a position detector 312 of the secured device 205 used to detect the position of the secured device 205 (for example, by means of the GPS receiver). The support agent 306 accesses (in read mode) a communication mode repository 315 storing information about the communication modes that are supported by the secured device 205 and that may be used for backing-up information stored in the secured device 205 (for example, Bluetooth, 3G). Particularly, for each communication mode, a priority rule is stored for calculating a priority index of each support device 210 supporting the same communication mode (for example, based on a predefined percentage of a data rate of a communication channel between the secured device 205 and the support device 210). The support agent 306 controls (in write mode) a support device repository 318 storing an indication of the support devices 210 (for example, a list of the communication modes having one or more support devices 210 in decreasing order of priority according to the corresponding priority indexes). The support agent 306 interfaces (in input/output) with a local communication drive 321 of the secured device 205 (or more) used to communicate with the access points and the other smart-phones (and in particular with the support devices 210).

The back-up application 303 further comprises a back-up agent 324 used to send the back-up information to the support devices 210. For this purpose, the back-up agent 324 exposes a selection interface for allowing a user of the secured device 205 to select one or more selected information files 327 storing the desired information to be backed-up (with an indication the information that is saved in a corresponding configuration file of the back-up agent 324, not shown in FIG. 3). The back-up agent 324 accesses (in read mode) a back-up information file 330 storing the back-up information ready to be sent to the support devices 210. An encryption tool 333 is used to encrypt the selected information into the back-up information. For this purpose, the encryption tool 333 accesses (in read mode) the selected information files 327 (as indicated in the corresponding configuration file) and controls (in write mode) the back-up information file 330. An update detector 336 accesses (in read mode) the selected information files 327 (as indicated in the corresponding configuration file) to detect any change thereof and controls the encryption tool 333 accordingly. The back-up agent 324 further controls (in read/write mode) a unique identifier (ID) repository 339 storing a (one-time) unique identifier assigned to the secured device 205 by the back-up server 125. The back-up agent 324 exploits an accelerometer drive 340 of the secured device 205 driving its accelerometer. The back-up agent 324 interfaces (in output) with the local communication drive 321 and interfaces (in input/output) with a remote communication drive 342 of the secured device 205 used to communicate with the mobile network 105, not shown in FIG. 3 (and in particular with the back-up server 125 in the Internet 120). The secured device 205 further runs a web browser 345 used to surf the Internet 120. For this purpose, the web browser 345 interfaces (in input/output) with the local communication drive 312 and with the remote communication drive 342 (to access the Internet 129 through the access points and the mobile network 1p5, respectively).

Each support device 210 (only one shown in FIG. 3) runs an upload agent 348 used to upload the back-up information of each secured device 205 to the back-up server 125. For this purpose, the upload agent 348 interfaces input) with a local communication drive 351 used to communicate with the smart-phones (and in particular with the secured devices 205) and interfaces (in input/output) with a remote communication drive 354 used to communicate with the mobile network 105 (and in particular with the back-up server 125 in the Internet 120).

The back-up server 125 runs a back-up manager 357 used to manage the back-up of information of the secured devices 205 (uploaded thereto by the support devices 210). For this purpose, the back-up manager 357 interfaces (in input/output) with a remote communication drive 360 (or more) used to communicate with the smart-phones and the access points (and in particular with the secured devices 205 and the support devices 210). The back-up manager 357 exposes a web interface for allowing the users of the secured devices 205 to register with the back-up server 125 in the Internet 120. The back-up manager 357 accordingly controls (in read/write mode) a user repository 363 storing information about the registered users. Particularly, for each user an email address also used as the user's user ID), a password and a telephone number of each secured device 205 are stored. The back-up agent 357 controls a unique identifier generator 366 used to generate the unique identifiers of the secured devices 205. The unique identifier generator 366 interfaces communicatively (in output) with the remote communication drive 360. The back-up agent 357 further controls a (back-up) information manager 369 used to manage the back-up information that has been uploaded to the back-up server 125 by the support devices 210, stored in corresponding back-up information files 372. The back-up server 125 exposes a download interface 375 for allowing the users of the secured devices 205 to download the corresponding back-up information (previously uploaded to the back-up server 125). For this purpose, the download interface 375 accesses (in read mode) the back-up information files 372 and interfaces output) with the remote communication drive 360.

Figure 4A:
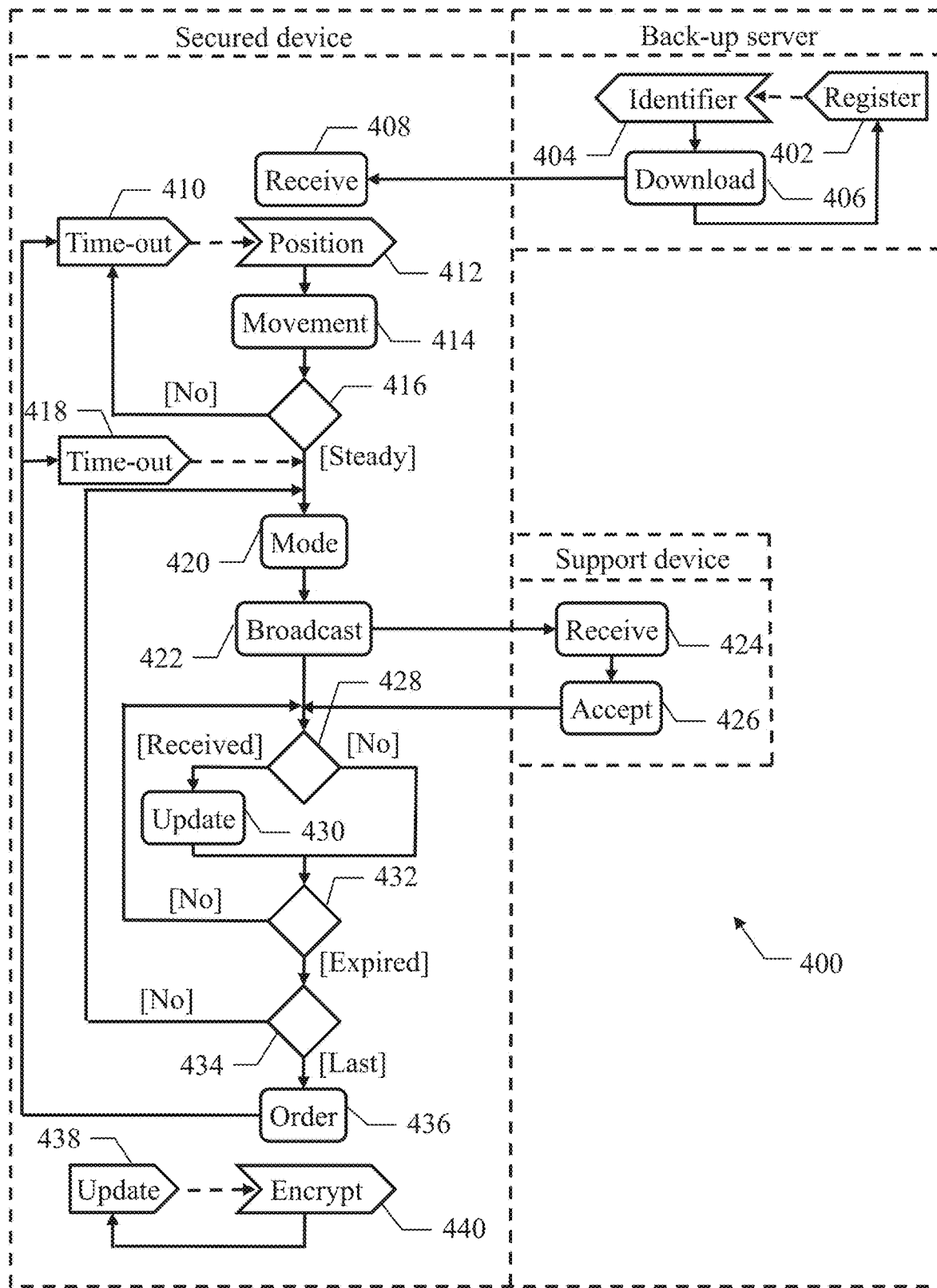
FIGS. 4A-4B show a diagram of activities for implementing embodiments of the present invention.
Figure 4B:
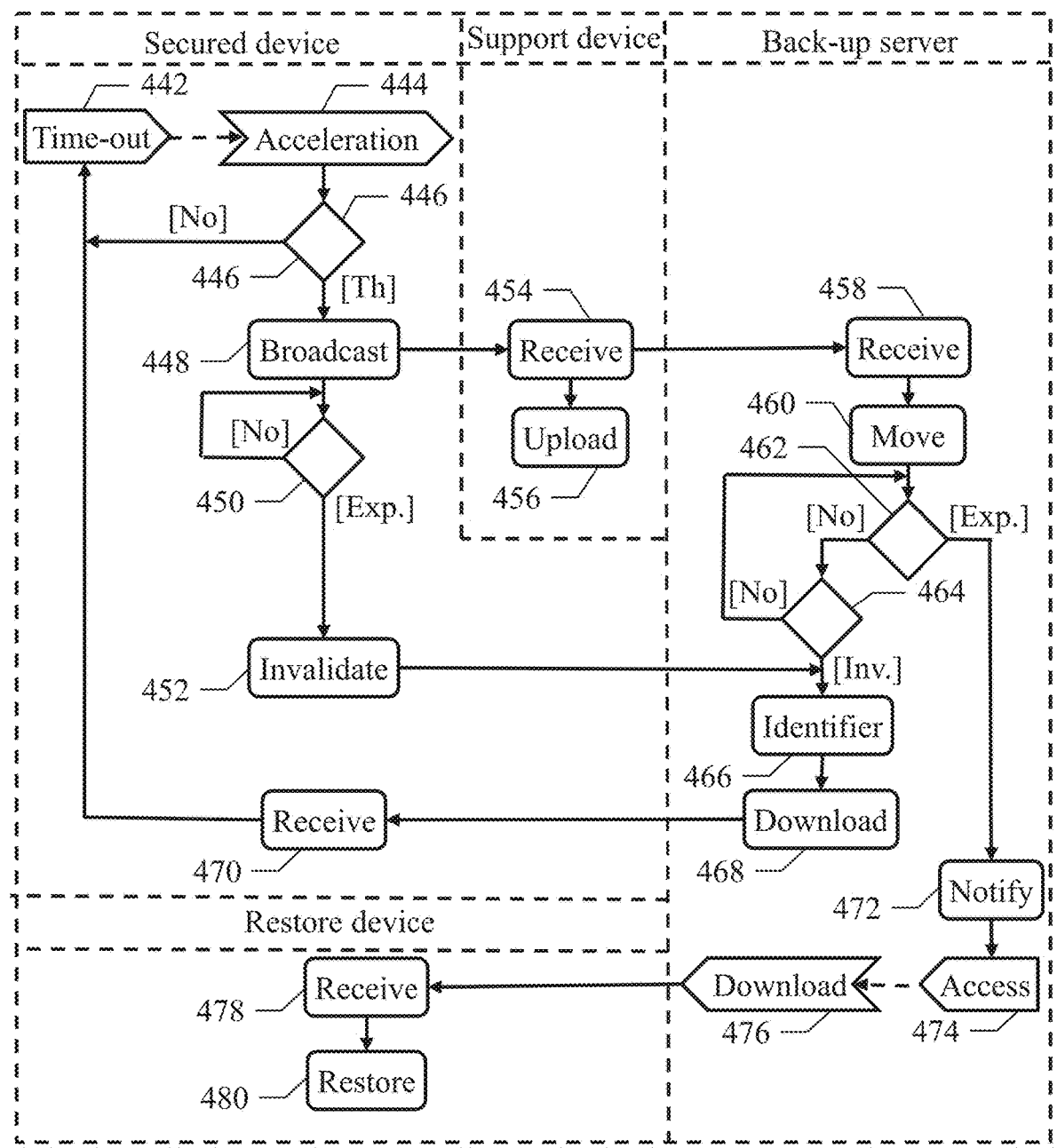

FIGS. 4A-4B shows a diagram of activities for implementing embodiments of the present invention.

FIGS. 4A-4B represent an exemplary process (which may be used to back-up information stored in a secured device 205) with a method 400. In this respect, each block of FIGS. 4A-4B may correspond to one or more executable instructions for implementing the specified logical function in the corresponding computing device. FIG. 4A comprises swim-lanes (i.e., vertically oriented columns in which blocks are inserted) for a secured device 205 and a back-up server 125.

Starting from the swim-lane of the back-up server at block 402, at the beginning, a user of the secured device 205 registers to the back-up server 125. For this purpose, the user accesses the user's web interface in the Internet 120 (for example, with the web browser 345 of the secured device 205 or of another computer) and enters information comprising the user's e-mail address, the user's password, and a telephone number of the secured device 205. In response, the back-up manager 357 creates a new entry for the user in the user repository 363 with the preceding information.

In block 404, the back-up manager 357 commands the unique identifier generator 366 to generate a new unique identifier for the secured device 205. The unique identifier generator 366 then downloads the (new) unique identifier to the secured device 205 at block 406 (through the remote communication drive 360). The flow of activity then returns to the block 402 waiting for a next request of registration to the back-up server 125. Moving to the swim-lane of the secured device 205, the back-up agent 324 receives the unique identifier at block 408 (through the remote communication drive 342) and the back-up agent 324 saves the unique identifier into the unique identifier repository.

In a completely independent way, the process passes from block 410 to block 412 in the swim-lane of the secured device 205 as soon as a movement time-out (in block 410) for monitoring the movement of the secured device 205 expires (for example, every 1-5 s). In response, the position detector 312 detects the (current) position of the secured device 205 (for example, defined by its UPS coordinates). Continuing to block 414, the movement detector 309 detects the (current) movement of the secured device 205 accordingly. For example, the movement detector 309 saves a predefined number of last positions of the secured device 205 in a corresponding shift register (for example, 5-20 last positions for 5-30 s), calculates a distance of each next position in the shift register from a starting position consisting of the oldest position therein and then defines the movement as the highest one of these distances. A test is then made at block 416, wherein the movement detector 309 compares the movement of the secured device 205 with a movement threshold (for example, 10-50 m). If the movement is higher than the movement threshold (meaning that the secured device 205 has not remained in a corresponding circular or elliptical area of the communication range 215 around the starting position), the process returns to the block 410 waiting for a next expiration of the movement time-out. Conversely if the movement is not higher than the movement threshold, the movement detector 309 detects a steady condition of the secured device 205 and in response, a detection loop is entered at block 420 for detecting the support devices. In this way, the operations required to detect the support devices are performed only when it is likely that the support devices are well defined (because of the steady condition of the secured device 205), so as to limit any performance degradation. The same detection loop is also entered from block 418 as soon as a detection time-out expires in block 418 (for example, every 5-10 s). In this way, the support devices may be detected in any condition (even when the secured device 205 is moving).

In both cases (i.e., movement being or not being higher than the movement threshold), the detection loop begins at block 420 wherein the support agent 306 takes a (current) communication mode of the secured device 205 into account (starting from a first communication mode in any arbitrary ordered as indicated in the communication mode repository 315). The support agent 306 at block 422 broadcasts a support request message for the communication mode (through the local communication drive 342). The support request message is broadcast in a support area around the (current) position of the secured device 205, corresponding to a transmission range of the communication mode (for example, of the order of 50-500 m for the Wi-Fi and of 1-50 m for the Bluetooth). The support request message has a predefined back-up format (compliant to the communication mode), which comprises, for example, a header identifying the request message as a back-up message relating to the back-up application 303, an action field indicating a request of availability for supporting the secured device 205, and an address field and a body that are left empty. The upload agent 348 of any support devices that are located within the support area and that support the same communication mode receive the support request message (through the local communication drive 351) at block 424 in the corresponding swim-lane. In response, the upload agent 348 at block 426 returns a support availability message to the secured device 205 (through the local communication drive 351). The support availability message has the back-up format again but now comprises (in addition to the same header identifying the support availability message as a back-up message, the empty address field and the empty body) the action field indicating the availability of the support device 210 to support the secured device 205. This operation is very fast (since it only implements a simple handshaking establishing the availability of the support device 210), so that it does not involve any significant performance degradation.

Returning to the swim-lane of the secured device 205, the flow of activity descends from the block 422 to block 428, wherein the support agent 306 verifies whether any support availability message has been received. If so, the support agent 306 updates the support device repository 318 accordingly at block 430. For example, the support agent 306 derives a data rate (of a communication channel between the secured device 205 and the support device 210) from the support availability message, calculates the priority index of the support device 210 by applying the priority rule of the communication mode (retrieved from the communication mode repository 315) to this data rate and then adds the priority index to the entry for the communication mode in the support device repository 318. The process then descends into block 432. The same point is also reached directly from the block 428 when no support availability message has been received. At this point, the support agent 306 verifies whether a detection period from the broadcast of the support request message (for example, 2-5 s) has expired. If not, the process returns to the block 428 waiting for a next support availability message. Conversely, as soon as the detection period has expired, the flow of activity descends into block 434 at which the support agent 306 verifies whether a last communication mode has been processed. If not, the process returns to the block 420 to repeat the same operations for a next communication mode. Conversely, once all the communication modes have been processed, the detection loop is exited by descending into block 436 at which the support agent 306 orders the supports devices. For example, in an embodiment this operation is performed at the level of the communication modes. For this purpose, the support agent 306 assigns a priority index to each communication mode having one or more support devices (for example, defined by the highest priority index of its support devices) and then arranges the communication modes in the support device repository 318 in decreasing order of the priority indexes of the support devices. The flow of activity then returns to the block 410 (waiting for a next expiration of the movement time-out) or to the block 418 (waiting for a next expiration of the detection time-out).

In a completely independent way, the process passes from block 438 to block 440 as soon as the update detector 336 detects any change of the selected information files (for example, by listening for any writing operation performed thereon). In response, the update detector 336 commands the encryption tool 333 to create a new version of the back-up information file by compressing the selected information files into a single file and then encrypting the single file with a secret key of the user of the secured device 205 (stored in a corresponding configuration file of the back-up agent 324). The update detector 336 may also be configured to compare the size of the back-up information file with a maximum value. The maximum value is defined so as to ensure that the back-up information may be sent to the support devices (in most practical situations) between the detection of any dangerous condition and the possible breakage of the secured device 205 For example, the maximum value is set to a percentage (e.g., 50-80%) of the product between the lowest average data rate of all the communication modes supported by the secured device 205 (e.g., 100 kByte/s) and a typical falling time of the secured device 205 from the elevation of the secured device 205 under normal conditions of use (e.g., 0.5 s). When the size of the back-up information file exceeds the maximum value, the update detector 336 generates an error message (for example, with a corresponding notification), so as to cause the user to reduce the selected information accordingly. The flow of activity then returns to the block 438 waiting for a next update of the selected information files.

In a completely independent way, the process passes from block 442 to block 444 in FIG. 4B as soon as a dangerous time-out for monitoring the condition of the secured device 205 expires. The dangerous time-out is quite short (for example, 0.1-1 ms) and is served with the highest possible priority to ensure a prompt reaction by the back-up application 303. In response, the back-up agent 324 retrieves the (current) acceleration of the secured device 205 along a vertical direction (as provided by the accelerometer drive 340). A test is then made at block 446, wherein the back-up agent 324 compares the acceleration with an acceleration threshold corresponding to the free fall; for example, 0-1 m/s$^2$. If the acceleration is higher than the acceleration threshold (meaning that the secured device is not free falling), the process returns to the block 442 waiting for a next expiration of the dangerous time-out. Conversely, the back-up agent 324 detects a dangerous condition of the secured device 205 since the secured device 205 is likely to be falling down with a risk of breakage.

In response, the back-up agent 324 at block 448 broadcasts a back-up message with the communication mode having the highest priority index (i.e., the first communication mode in the support device repository). The back-up message has the back-up format again but now comprises (in addition to the same header identifying the broadcast message as a back-up message) the action field indicating a request of uploading the back-up information to the back-up server 125, the address field comprising a network address of the back-up server 125 (defined as a configuration parameter of the back-up agent 324) followed by the unique identifier of the secured device 205 (retrieved from the unique identifier repository) and the body comprising the back-up information file. The choice of the communication mode having the highest priority index provides the fastest possible way of sending the back-up information to the support devices, which reduces the risk of having not enough time to send the back-up information to the support devices (before a possible breakage of the secured device 205). Moreover, the choice of broadcasting the back-up information to all the support devices of this communication mode increases the probability of having at least one of the support devices actually receiving the back-up information. The back-up agent 324 then repeats the broadcasting of the back-up message with each next communication mode in decreasing order of their priority indexes (as listed in the support device repository 318). This operation is continued until all the communication modes indicated in the support device repository 318 (having at least one support device) have been used or the secured device breaks which further increases the probability of having at least one support device actually receiving the back-up information. The back-up agent 324 then enters an idle loop at block 450, waiting for expiration of a breakage period from the first broadcast of the back-up information (for example, 5-10 s). As soon as the breakage period expires (with the secured device that is still working), the flow of activity descends into block 452 which means that the secured device 205 did not break (for example, because the secured device 205 did not fall down or was not damaged). In this case, the back-up agent 324 sends an invalidation message to the back-up server 125 (through the remote communication drive 342) at its network address (retrieved from the corresponding configuration parameter).

The upload agent 348 of any support devices (within the support supporting the same communication mode of each back-up message receives the back-up message (through the local communication drive 351) at block 454. In response, the upload agent 348 at block 456 uploads the back-up information (extracted from the body of the back-up message) to the back-up server 125 (at the network address extracted from the address field of the back-up message).

The back-up manager 357 of the back-up server 125 receives the back-up information from each support device (through the remote communication drive 360) at block 458 in the corresponding swim-lane. Particularly, the back-up information is stored progressively in a buffer area for each support device. As soon as the upload of the back-up information from a support device has been completed, the back-up manager 357 accepts the back-up information (by discarding the buffer areas for any other support device) and sends a corresponding message to all of the support devices that were uploading the same back-up information so as to cause the support devices that were uploading to abort the uploading (if still in progress) and in any case to delete the back-up message. In this way, the back-up information remains stored in the support devices only for a short time (required to upload the back-up information to the back-up server 125), which reduces any security exposure. Continuing to block 460, the information manager 369 moves the back-up information to a protected area corresponding to the unique identifier of the back-up information. In this way, the back-up information may be uploaded to the back-up server 125 in a safe way, without a need of providing any undesired authorizations to the support devices. The back-up manager 357 verifies at block 462 whether an invalidation period from the upload of the back-up information (corresponding a multiple of the breakage period, for example, 2-10 times it) has expired. If not, the back-up manager 357 verifies at block 464 whether the invalidation message has been received from the secured device 205. If not, the flow of activity returns to the block 462 in an idle loop. Conversely, if the invalidation message has been received (from the secured device at block 452 when the secured device 205 did not break) the back-up manager 357 commands the unique identifier generator 366 at block 466 to generate a new unique identifier for the secured device 205. The unique identifier generator 366 then downloads the (new) unique identifier to the secured device 205 at block 468 (through the remote communication drive 360).

Moving to the swim-lane of the secured device 205, the back-up agent 324 receives the unique identifier at block 470

(through the remote communication drive 342) and its saves the unique identifier into the unique identifier repository (by replacing the previous version of the unique identifier). In this phase, a handshaking mechanism is implemented between the secured device 205 and the back-up server 125 to cause the back-up manager 357 of the back-up server 125 to delete (through the information manager 369) the back-up information once the new unique identifier has been saved in the secured device 205 and the user has confirmed that the secured device 205 is actually operative (so as to prevent the risk of losing information if the secured device 205 falls down in the meanwhile or it has been lost) which further increases the security, since the unique identifier of the secured device 205 is valid only for a single upload of the back-up information (so that the support devices may not abuse the unique identifier).

Referring back to block 462 in the swim-lane of the back-up server 125, if the invalidation period has expired without the invalidation message having been received by the back-up server 125 (meaning that the secured device actually broke), the flow of activity descends into block 472. At this point, the back-up manager 357 sends the unique identifier of the secured device 205 to the user. For example, the back-up manager 357 may send an e-mail (through the remote communication drive 360) to the e-mail address of the user (retrieved from the user repository 363), wherein the e-mail contains a link to the protected area corresponding to the unique identifier. Once the user has obtained a new smart-phone (with the same telephone number and the back-up application 303) or has repaired the (broken) secured device 205 (hereinafter, referred to as restore device in both cases), the user accesses the corresponding protected area of the back-up server 125 at block 474 (with the web browser, 345 by clicking on this link) and authenticates by entering the user's password. The user may then require the downloading of the back-up information to the restore device at block 476 and in response, the download interface 375 downloads the back-up information to the restore device (through the remote communication interface 360).

Moving to the swim-lane of the secured device 205, the back-up agent 324 receives the back-up information at block 478 (through the remote communication drive 342) and saves the back-up information into the back-information file. Continuing to block 480, the user requests the encryption tool 333 to decrypt the back-up information (with the secret key retrieved from the corresponding configuration file or entered manually) so as to restore the selected information files.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present invention may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present invention may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relation (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for backing-up information stored in a mobile computing device. However, the mobile computing device may be of any type, for example, any computing device of small size (typically small enough to be handheld) and/or expected to be transported during normal usage (like a smart-phone, a tablet, a netbook).

In an embodiment, the method comprises detecting one or more support computing devices by the mobile computing device. However, the support computing devices may be in any number and of any type, and they may detected in any way (see below).

In an embodiment, the support computing devices are located within a corresponding communication range and are available to support the mobile computing device for backing-up information. However, the support computing devices may be located at any distance from the mobile computing device (for example, allowing the support computing devices to communicate, i.e., exchange information, with the mobile computing device directly) and may be available to support the mobile computing device in any way (for example, statically according to the configuration of the support computing devices or dynamically according to a current condition of the support computing devices such as, inter alia, a workload lower than a predefined threshold).

In an embodiment, the method comprises detecting a dangerous condition by the mobile computing device indicative of a risk of inoperability thereof. However, the dangerous condition may be detected in any way (see below) and it may be indicative of any inoperability of the mobile computing device (for example, its breakage, loss).

In an embodiment, the method comprises sending back-up information corresponding to selected information stored in the mobile computing device to at least one of the support computing devices in response to the detection of the dangerous condition. However, the selected information may be of any type (for example, passwords, personal data, telephone numbers and/or addresses filed any number of files, parameters) and defined in any way (either automatically or manually), and the back-up information may defined in any way according thereto (for example, by corresponding files or by compressing the back-up information into a single file). Moreover, the back-up information may be sent to any number of support computing devices (from a single support computing device to all of the support computing devices) which in an embodiment, causes the at least one support computing device to upload the back-up information to a back-up computing system. However, the back-up information may be uploaded in any way (for example, with a dedicated connection) to any back-up computing system (for example, a cloud service, one or more private servers, etc.).

In an embodiment, the step of detecting one or more support computing devices comprises broadcasting a support request message by the mobile computing device in a support area around a current position to cause each support computing device in the support area to return a support availability message. However, the support request message and the support availability message may be of any type (for example, with different formats, with a common format comprising a flag for indicating the availability of each support computing device) and the support request message and the support availability message may be transmitted in any way within any support area around the mobile computing device. In any case, the support computing devices may also be detected in different ways (for example, with the mobile computing device that is listening for corresponding messages that are broadcast by each support computing device periodically).

In an embodiment, the step of detecting one or more support computing devices comprises detecting each support computing device in response to a receipt by the mobile computing device of the corresponding support availability message in a detection period from the broadcasting of the support request message. However, the detection period may have any value. In any case, the possibility of stopping the detection of the support computing devices as soon as a predefined number (one or more) of support availability messages is received is not excluded.

In an embodiment, the step of detecting one or more support computing devices comprises detecting the support computing devices supporting at least one communication mode of a plurality of communication modes supported by the mobile computing device. However, the communication modes may be in any number (down to a single communication mode) and of any type (for example, Wi-Fi, Bluetooth, WiMax, EDGE, UMTS, HDPSA, LTE). Moreover, the detection of the support computing devices may relate to any number of communication modes supported by the mobile computing device (from a single communication mode to all of the communication modes).

In an embodiment, said step of detecting one or more support computing devices comprises broadcasting a support request message for each communication mode by the mobile computing device in a corresponding support area around a current position thereof to cause each support computing device in the support area supporting the communication mode to return a support availability message. However, the support request message and the support availability message may be of any type and they may be transmitted within any support area (see above) In any case, the support computing devices may also be detected in different ways for one or more of the communication modes (either the same for all the communication modes or different for each one of the communication modes).

In an embodiment, the step of detecting one or more support computing devices comprises detecting each support computing device for each communication mode in response to a receipt by the mobile computing device of the corresponding support availability message in a detection period from the broadcasting of the corresponding support request message. However, the detection period may have any value (either the same for all the communication modes or different for each one of the communication modes). In this case as well, the possibility is not excluded of stopping the detection of the support computing devices as soon as a predefined number (one or more) of support availability messages is received for a predefined number (one or more) of communication modes (in decreasing order of priority).

In an embodiment, the step of sending back-up information comprises broadcasting the back-up information with at least a selected one of the communication modes. However, the back-up information may be broadcast with any number of selected communication modes (from a single communication mode to all of the communication modes).

In an embodiment, the at least one selected communication mode is selected from the communication modes having at least one support computing device in decreasing order of priority thereof. However, the selected communication mode(s) may be selected from the communication modes having any minimum number (one or more) of support computing devices and according to any priority order (see below).

In an embodiment, the step of detecting one or more support computing devices comprises ordering the communication modes having at least one support computing device in decreasing order of priority according to a data rate of said at least one support computing device. However, the priority order of the communication modes may be defined in any way according to the data rates of the corresponding support computing devices (for example, the maximum value, average value of the priorities) or more generally in different, additional or alternative way (for example, according to the number of support computing devices).

In an embodiment, the step of detecting one or more support computing devices comprises monitoring an indication of a movement of the mobile computing device. However, the movement may be monitored in any way (for example, according to the corresponding mobile telephone cells).

In an embodiment, the step of detecting one or more support computing devices comprises detecting a steady condition of the mobile computing device in response to the indication of the movement of the mobile computing device remaining within a movement threshold. However, the steady condition may be detected in any way (for example, according to any movement of the mobile computing device, such has the maximum distance or the total travel from the starting point of the mobile computing device).

In an embodiment, the step of detecting one or more support computing devices comprises updating the support computing devices in response to the detection of the steady condition. However, the support computing devices may be detected in different, additional or alternative ways (for example, when the mobile computing device is in the steady condition, when the mobile computing device remains stationary for a predefined period, periodically or in any combination thereof, etc.).

In an embodiment, the detecting one or more support computing devices comprises detecting one or more network access points and/or further mobile computing devices being located within the corresponding communication range and being available to support the mobile computing device for backing-up information. However, the support computing devices may be of any type (for example, only access points, only mobile computing devices of any type, such as smartphones, tablets and netbooks, base stations or any combination thereof).

In an embodiment, the method further comprises encrypting the selected information into the back-up information in response to each update of the selected information. However, the selected information may be encrypted in any way (for example, with an access password of the mobile computing device or with a IMEI of the mobile computing device) and at any time (for example, by monitoring a checksum of each file of the selected information or with hooking techniques). In any case, this operation may also be omitted at all (for example, when the selected information is already encrypted or is not sensitive).

In an embodiment, the step of sending back-up information comprises sending a back-up network address in association with the back-up information to said at least one support computing device. However, the back-up network address may be of any type and it may be associated in any way with the back-up information (for example, in a dedicated field or embedded therein). In any case, the use of a predefined back-up network address for all the mobile computing devices is not excluded which causes the at least one support computing device to upload the back-up information to the back-up computing system at the back-up network address. However, the back-up network address may also be already stored in each support computing device (for example, at detection of the back-up network address by the mobile computing device).

In an embodiment, the method further comprises receiving a unique identifier thereof by the mobile computing device from the back-up computing system. However, the unique identifier may be provided to the mobile computing device in any way (for example, at the installation of the back-up application 303); in any case, an implementation without the use of any unique identifier is feasible.

In an embodiment, the back-up network address comprises the unique identifier. However, the unique identifier may be associated with the back-up information in any way (for example, in a dedicated field) which causes the back-up computing system to move the back-up information being uploaded to a location corresponding to the unique identifier. However, the location corresponding to the unique identifier may be of any type (for example, a reserved area, a back-end folder) and may be determined in any way (for example, directly defined by the unique identifier or obtained therefrom, such as with a look-up table). In any case, the possibility of leaving the back-up information where it has been uploaded is not excluded.

In an embodiment, the method further comprises receiving a new unique identifier thereof by the mobile computing device from the back-up computing system in response to expiration of an invalidation period from the detection of the dangerous condition without the inoperability of the mobile computing device. However, the new unique identifier may be provided to the mobile computing device in any way (for example, downloaded by the back-up computing system or requested by the mobile computing device). Moreover, this operation may be performed after any invalidation period or simply when the mobile computing device responds to an interrogation of the back-up computing system after the latter has received the back-up information. In any case, the possibility of maintaining the same unique identifier (even when the mobile computing device did not break) is not excluded.

In an embodiment, the step of detecting a dangerous condition comprises monitoring at least one acceleration of the mobile computing device. However, the accelerations may be in any number and of any type (for example, only along an axis of the accelerometer in the vertical direction as identified by a gyroscope or along all the X, Y, Z axes of the accelerometer).

In an embodiment, said step of detecting a dangerous condition comprises detecting the dangerous condition in response to the at least one acceleration being indicative of a falling down of the mobile computing device. However, the dangerous condition may be detected in any way according to the acceleration(s) (for example, when any acceleration exceeds a safety value). In any case, the possibility of detecting different dangerous conditions is not excluded (for example, according to the temperature, the humidity of the mobile computing device).

Generally, similar considerations apply if the same solution is implemented with an equivalent method (by using similar steps with the same functions of more steps or portions thereof, removing some steps being non-essential, or adding further optional steps). Moreover, the steps may be performed in a different order, concurrently or in an interleaved way (at least in part).

An embodiment provides a computer program configured for causing a mobile computing device to perform the above-mentioned method when the computer program is executed on the mobile computing device. An embodiment provides a computer program product, the computer program product comprising a computer readable storage medium having program instructions embodied therewith, the program instructions executable by a mobile computing device to cause the mobile computing device to perform the same method. However, the computer program may be implemented as a stand-alone module, as a plug-in for a pre-existing software application (for example, an operating system of the mobile computing device), or even directly in the latter. In any case, the solution according to an embodiment of the present invention lends itself to be implemented even with a hardware structure (for example, by electronic circuits integrated in one or more chips of semiconductor material), or with a combination of software and hardware suitably programmed or otherwise configured.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention includes one or more computer readable hardware storage devices having computer readable program code stored therein, said program code containing instructions executable by one or more processors of a computing system (or computer system) to implement the methods of the present invention.

A computer system of the present invention includes one or more processors, one or more memories, and one or more computer readable hardware storage devices, said one or more hardware storage devices containing program code executable by the one or more processors via the one or more memories to implement the methods of the present invention.

An embodiment provides a mobile computing device comprising means configured for performing the above-mentioned method. An embodiment provides a mobile computing device comprising a circuitry (i.e., any hardware suitably configured, for example, by software) for performing each step of the same method.

An embodiment provides a system comprising one or more of these mobile computing devices with one or more support computing devices and/or with the back-up computing system.

However, the mobile computing devices, the support computing devices and the back-up computing system may be in any number and of any type (see above).

Generally, similar considerations apply if the mobile computing device, each support computing device and the back-up computing system each has a different structure or comprises equivalent components or it has other operative characteristics. In any case, every component thereof may be separated into more elements, or two or more components may be combined together into a single element. Moreover, each component may be replicated to support the execution of the corresponding operations in parallel. Moreover, less specified otherwise, any interaction between different components generally does not need to be continuous, and it may be either direct or indirect through one or more intermediaries.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for backing-up information stored in a mobile computing device, said method comprising:
   in response to a determination that a movement of the mobile computing device of a distance is not higher than a specified distance movement threshold, detecting, by the mobile computing device, one or more support computing devices located within a corresponding communication range and being available to support the mobile computing device for backing-up the information stored in the mobile computing device;
   detecting, by the mobile computing device, a dangerous condition indicative of a risk of inoperability of the mobile computing device; and
   sending, by the mobile computing device, back-up information corresponding to selected information stored in the mobile computing device to at least one support computing device of the support computing devices in response to said detecting the dangerous condition, wherein said sending the back-up information to at least one of the support computing devices causes an upload of the back-up information from the at least one support computing device to a back-up computing system.

2. The method of claim 1, wherein said detecting one or more support computing devices comprises:
   broadcasting a support request message in a support area around a current position to cause each support computing device in the support area to return a support availability message; and
   detecting each support computing device in response to a receipt by the mobile computing device of the corresponding support availability message in a detection period from said broadcasting the support request message.

3. The method of claim 1, wherein said detecting one or more support computing devices comprises:
   detecting the support computing devices supporting at least one communication mode of a plurality of communication modes supported by the mobile computing device.

4. The method of claim 3, wherein said detecting one or more support computing devices comprises:
   broadcasting a support request message for each communication mode in a corresponding support area around a current position of the mobile computing device to cause each support computing device in the support area supporting the communication mode to return a support availability message; and
   detecting each support computing device for each communication mode in response to a receipt by the mobile computing device of the corresponding support availability message in a detection period from the broadcasting of the corresponding support request message.

5. The method of claim 3, wherein said sending back-up information comprises:
   broadcasting the back-up information with at least a selected one communication mode of the communication modes, said at least one selected communication mode being selected among the communication modes having the at least one support computing device in decreasing order of priority of the communication modes.

6. The method of claim 5, wherein said detecting one or more support computing devices comprises:
   ordering the communication modes having at least one support computing device in decreasing order of priority of the communication modes according to a data rate of the at least one support computing device.

7. The method of claim 1, wherein the back-up information is deleted from the at least one support computing device in response to the at least one support computing device having received a message from the back-up computing system after the upload has been completed.

8. The method of claim 1, wherein said detecting one or more support computing devices comprises:
   detecting one or more network access points and/or further mobile computing devices being located within the corresponding communication range and being available to support the mobile computing device for backing-up information.

9. The method of claim 1, said method further comprising:
   encrypting, by the mobile computing device, the selected information into the back-up information in response to each update of the selected information.

10. The method of claim 1, wherein said sending back-up information comprises:
    sending a back-up network address in association with the back-up information to the at least one support computing device to cause the at least one support computing device to upload the back-up information to the back-up computing system at the back-up network address.

11. The method of claim 10, said method further comprising:
    receiving, by the mobile computing device, a unique identifier of the mobile computing device from the back-up computing system, said back-up network address comprising the unique identifier to cause the back-up computing system to move the back-up information being uploaded to a location corresponding to the unique identifier.

12. The method of claim 11, said method further comprising:
    receiving, by the mobile computing device, a new unique identifier of the mobile computing device from the back-up computing system in response to expiration of an invalidation period from said detecting the dangerous condition without the inoperability of the mobile computing device.

13. The method of claim 1, wherein said detecting the dangerous condition comprises:
    monitoring at least one acceleration of the mobile computing device; and
    detecting the dangerous condition in response to the at least one acceleration being indicative of a falling down of the mobile computing device.

14. A computer program product, comprising a computer readable hardware storage device having program instructions embodied therein, said program instructions upon being executed by a mobile computing device implements a method for backing-up information stored in the mobile computing device, said method comprising:

in response to a determination that a movement of the mobile computing device of a distance is not higher than a specified distance movement threshold, detecting, by the mobile computing device, one or more support computing devices located within a corresponding communication range and being available to support the mobile computing device for backing-up the information stored in the mobile computing device;

detecting, by the mobile computing device, a dangerous condition indicative of a risk of inoperability of the mobile computing device; and sending, by the mobile computing device, back-up information corresponding to selected information stored in the mobile computing device to at least one support computing device of the support computing devices in response to said detecting the dangerous condition, wherein said sending the back-up information to at least one of the support computing devices causes an upload of the back-up information from the at least one support computing device to a back-up computing system.

15. The computer program product of claim 14, wherein said detecting one or more support computing devices comprises:

broadcasting a support request message in a support area around a current position to cause each support computing device in the support area to return a support availability message; and detecting each support computing device in response to a receipt by the mobile computing device of the corresponding support availability message in a detection period from said broadcasting the support request message.

16. The computer program product of claim 14, wherein said detecting one or more support computing devices comprises:

detecting the support computing devices supporting at least one communication mode of a plurality of communication modes supported by the mobile computing device.

17. The computer program product of claim 16, wherein said detecting one or more support computing devices comprises:

broadcasting a support request message for each communication mode in a corresponding support area around a current position of the mobile computing device to cause each support computing device in the support area supporting the communication mode to return a support availability message; and detecting each support computing device for each communication mode in response to a receipt by the mobile computing device of the corresponding support availability message in a detection period from the broadcasting of the corresponding support request message.

18. The computer program product of claim 16, wherein said sending back-up information comprises:

broadcasting the back-up information with at least a selected one communication mode of the communication modes, said at least one selected communication mode being selected among the communication modes having at least one support computing device in decreasing order of priority of the communication modes.

19. The computer program product of claim 18, wherein said detecting one or more support computing devices comprises:

ordering the communication modes having at least one support computing device in decreasing order of priority of the communication modes according to a data rate of the at least one support computing device.

20. A mobile computing device, comprising: a computer readable hardware storage device having program instructions embodied therein, said program instructions upon being executed by the mobile computing device implements a method for backing-up information stored in the mobile computing device, said method comprising:

in response to a determination that a movement of the mobile computing device of a distance is not higher than a specified distance movement threshold, detecting, by the mobile computing device, one or more support computing devices located within a corresponding communication range and being available to support the mobile computing device for backing-up the information stored in the mobile computing device;

detecting, by the mobile computing device, a dangerous condition indicative of a risk of inoperability of the mobile computing device; and sending, by the mobile computing device, back-up information corresponding to selected information stored in the mobile computing device to at least one support computing device of the support computing devices in response to said detecting the dangerous condition, wherein said sending the back-up information to at least one of the support computing devices causes an upload of the back-up information from the at least one support computing device to a back-up computing system.

* * * * *